United States Patent
Chen

(12) 
(10) Patent No.: US 6,523,660 B1
(45) Date of Patent: Feb. 25, 2003

(54) WHEEL HUB DEVICE FOR A BICYCLE

(75) Inventor: Hubert Chen, Taichung Hsien (TW)

(73) Assignee: Ken Teng Industry Co., Ltd., Taichung Hsien (TW)

( * ) Notice: Subject to any disclaimer, the term of this patent is extended or adjusted under 35 U.S.C. 154(b) by 0 days.

(21) Appl. No.: 09/929,580

(22) Filed: Aug. 14, 2001

(51) Int. Cl.[7] .............................................. F16D 41/00
(52) U.S. Cl. ...................... 192/64; 192/94; 192/54.51; 301/110.5
(58) Field of Search .................... 192/64, 94, 54.51; 301/110.5

(56) References Cited

U.S. PATENT DOCUMENTS

| | | | | |
|---|---|---|---|---|
| 5,669,477 A | * | 9/1997 | Chen | 192/41 S |
| 5,718,315 A | * | 2/1998 | Chen | 192/45.1 |
| 6,244,405 B1 | * | 6/2001 | Chen | 192/64 |
| 6,401,895 B1 | * | 6/2002 | Chen | 192/64 |

* cited by examiner

*Primary Examiner*—Charles A Marmor
*Assistant Examiner*—Eric M. Williams
(74) *Attorney, Agent, or Firm*—Renner, Otto, Boisselle & Sklar, LLP

(57) ABSTRACT

A wheel hub device includes a driving barrel and a hub shell mounted rotatably on an axle of a bicycle. When the shell is rotated via the barrel to move the bicycle forward, a coupling socket disposed in the shell threadedly engages the barrel and frictionally engages the shell. A coil spring is disposed between the shell and the coupling socket such that a sudden termination of rotation of the barrel while the bicycle continues to move forward due to inertia, imparts a frictional force to the coil spring to enable the coil spring to keep biasing against the coupling socket and against the biasing force of a associating spring disposed between the coupling socket and a sliding member, thereby disengaging the coupling socket from the shell to permit smooth idle rotation of the latter and to prevent rotation of the barrel with the shell.

8 Claims, 6 Drawing Sheets

WHEEL HUB DEVICE FOR A BICYCLE

BACKGROUND OF THE INVENTION

1. Field of the Invention

The invention relates to a wheel hub device, more particularly to a wheel hub device for a bicycle, which permits smooth idle rotation of a hub shell relative to a driving barrel, and which ensures non-operation of the pedals when the cyclist drags the bicycle backwards so as to prevent possible injury to the cyclist.

2. Description of the Related Art

FIGS. 1 and 2 show a freewheeling hub device disclosed in co-pending U.S. patent application Ser. No. 09/761908 filed by the applicant on Jan. 17, 2001. As shown, the freewheeling hub device includes a hub shell 2 mounted rotatably on an axle 1 of a bicycle (not shown), a driving barrel 3 coupled to a lateral end of the hub shell 2, a limiting element 4 disposed to limit a lateral end of the driving barrel 3, a coupling socket 5 inserted via an opposite lateral end of the hub shell 2 and engaged threadedly with the driving barrel 3, a coil spring 6 having one end connected to an outer wall surface of the coupling socket 5, a connecting spring 7 connected to an inner wall surface of the coupling socket 5, a sliding member 8 connected to the connecting spring 7, a limiting block 9, and a cup 401 disposed to limit a lateral end of the limiting block 9. The hub shell 2 has an annular wall 201 with an inner wall surface 202. A tapered inner friction wall portion 203 and a shoulder portion 204 are disposed on the inner wall surface 202. The driving barrel 3 includes a toothed head portion 301 and an externally threaded portion 302 that extends axially from one end of the head portion 301. The coupling socket 5 has a tapered outer friction wall portion 501 formed on the outer wall surface thereof, and an internally threaded portion 502 threadedly engageable with the externally threaded portion 302. The coil spring 6 has a securing end 601 and an abutting end 602, and spirals clockwise from the securing end 601 to the abutting end 602 with a gradually enlarged curvature radius. The securing end 601 is insertably retained in an insert hole 503 in the coupling socket 5 via an insert pin 601', whereas the abutting end 602 abuts against the shoulder portion 204. The inner wall surface of the coupling socket 5 is in frictional contact with one end of the connecting spring 7. The sliding member 8 is connected to an opposite end of the connecting spring 7, and is disposed to fit into a non-circular hole in the cup 401 such that the sliding member 8 can displace only along an axial direction.

When the pedals of the bicycle are moved forwardly to rotate the driving barrel 3 corresponding to the direction of advancement of the bicycle, the coupling socket 5 is brought to displace toward the head portion 301 of the driving barrel 3 (the coil spring 6 being in a compressed state at this time), and the outer friction wall portion 501 engages the inner friction wall portion 203 of the hub shell 2. As such, the driving barrel 3, the coupling socket 5 and the hub shell 2 are coupled as a whole to enable the driving barrel 3 and the hub shell 2 to rotate synchronously to thereby move the bicycle forward. Conversely, when the pedals are moved backwards, the outer friction wall portion 501 will disengage from the inner friction wall portion 203 so that the hub shell 2 performs idle rotation relative to the driving barrel 3.

When the bicycle continues to move forward due to the action of inertia resulting from previous forward pedaling, the ideal situation is that the shoulder portion 204 retains the abutting end 602 of the coil spring 6 in a direction corresponding to the direction of advancement of the bicycle (as indicated by the arrow in FIG. 1), and that, when the abutting end 602 is being retained, due to the transmission of torque generated by the coil spring 6, the securing end 601 forces the coupling socket 5 to rotate relative to the connecting spring 7 (the torque of the coil spring 6 must be greater than the frictional force between the coupling socket 5 and the connecting spring 7), and the outer friction wall portion 501 quickly disengages from the inner friction wall portion 203 to allow the hub shell 2 to rotate freely in the idle state. Under the condition that the outer and inner friction wall portions 501, 203 are not engaged, when the cyclist gets off the bicycle to drag the bicycle backwards, the pedals will not turn to strike the cyclist's legs. However, the hub device described above may suffer from the following drawbacks:

1. As the coil spring 6 does not have a uniform curvature radius, during the transmission of torque, the several coils immediately before the abutting end 602 will also be retained by the shoulder portion 204 so that the abutting end 602 is squeezed outwardly toward the inner wall surface 202 of the hub shell 2 and may come into contact therewith to obstruct smooth rotation of the hub shell 2 and transmission of torque of the coil spring 6.

2. During the inertial forward motion of the bicycle, in order for the outer friction wall portion 501 to disengage from the inner friction wall portion 203 smoothly, the coil spring 6 must produce a torque that can resist the frictional force between the coupling socket 5 and the connecting spring 7. However, the retaining force provided by the shoulder portion 204 against the abutting end 602 is not sufficient to enable the securing end 601 to produce a sufficient torque to force the coupling socket 5 to rotate relative to the connecting spring 7, with the loss of torque during transmission taken into account. Thus, the outer friction wall portion 501 may not disengage from the inner friction wall portion 203 smoothly.

SUMMARY OF THE INVENTION

Therefore, the main object of the present invention is to provide a wheel hub device for a bicycle, which permits smooth idle rotation of a hub shell relative to a driving barrel, and which ensures non-operation of the pedals when the cyclist drags the bicycle backwards so as to prevent possible injury to the cyclist.

Accordingly, a wheel hub device according to the present invention is adapted for use in a bicycle which includes an axle extending in an axial direction, a sprocket wheel mounted coaxially around and rotatable relative to the axle, and a bicycle wheel which is mounted on the wheel hub device for rotation. The wheel hub device includes a hub shell, a driving barrel, a coupling socket, a sliding member, an associating spring, and a coil spring. The hub shell is adapted to be rotatably mounted on the axle, and has first and second lateral ends which are disposed opposite to each other in the axial direction, and an inner peripheral wall surface which extends in the axial direction to communicate the first and second lateral ends and which defines a through hole. The inner peripheral wall surface has a first wall portion and a second wall portion respectively proximate to the first and second lateral ends, and an intermediate wall portion which is disposed between the first and second wall portions and which defines a shoulder facing towards the second lateral end. The driving barrel is adapted to be rotatably mounted on the axle and is rotatable relative to the hub shell. The driving barrel includes a head portion which is disposed outwardly of the first lateral end and which is adapted to be rotated with the sprocket wheel, and an externally threaded portion which is disposed opposite to the head portion in the axial direction and which extends into the through hole so as to be surrounded by the intermediate wall portion. The coupling socket is disposed rotatably and movably in the through hole in the axial direction, and is adapted to be rotatably mounted around the axle. The coupling socket includes an engaging end, a coupling end, and an abutment member. The engaging end has a friction wall surface that confronts the intermediate wall portion, and an internally threaded portion that is disposed opposite to the friction wall surface in a direction radial to the axial direction to be movable in the axial direction between a fully engaged position, where the externally threaded portion is in a full threaded engagement with the internally threaded portion as a result of a clockwise rotation of the driving barrel relative to the coupling socket, which corresponds to a forward movement of the bicycle wheel, and where the friction wall surface is frictionally engaged with the intermediate wall portion as a result of the full threaded engagement, and a partially engaged position, where the externally threaded portion is in a partial threaded engagement with the internally threaded portion as a result of a screwing-out movement of the internally threaded portion relative to the externally threaded portion, and where the friction wall surface is disengaged from the intermediate wall portion. The coupling end is disposed opposite to the engaging end in the axial direction away from the driving barrel. The abutment member is disposed on and extends radially and outwardly from the coupling socket, and is located between the engaging end and the coupling end so as to spacedly face and move toward the shoulder in the axial direction when the internally threaded portion is moved to the fully engaged position. The sliding member is adapted to be sleeved on the axle, and is movable in the axial direction. The associating spring is mounted in the through hole and is adapted to be disposed around the axle. The associating spring is interposed between the coupling socket and the sliding member such that, during the screwing-out movement, the associating spring cooperates with the sliding member to stabilize movement of the coupling socket in the axial direction. The coil spring is adapted to be disposed around the axle, and is interposed between the shoulder and the abutment member. The coil spring has a first biasing force, and includes a depressed end disposed to bias against movement of the abutment member towards the shoulder and against a second biasing force of the associating spring, and an abutting end disposed opposite to the depressed end in the axial direction to abut against the shoulder such that when the clockwise rotation of the driving barrel is terminated suddenly while the forward movement of the bicycle continues as a result of inertia, the internally threaded portion rotates relative to the externally threaded portion in a screwing-out movement so as to be disposed in the partially engaged position, and a frictional force is simultaneously imparted to the abutting end to enable the depressed end to drag the abutment member and the coupling end of the coupling socket to rotate relative to the associating spring while the depressed end is biasing against movement of the abutment member and against the second biasing force so as to expedite the screwing-out movement.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
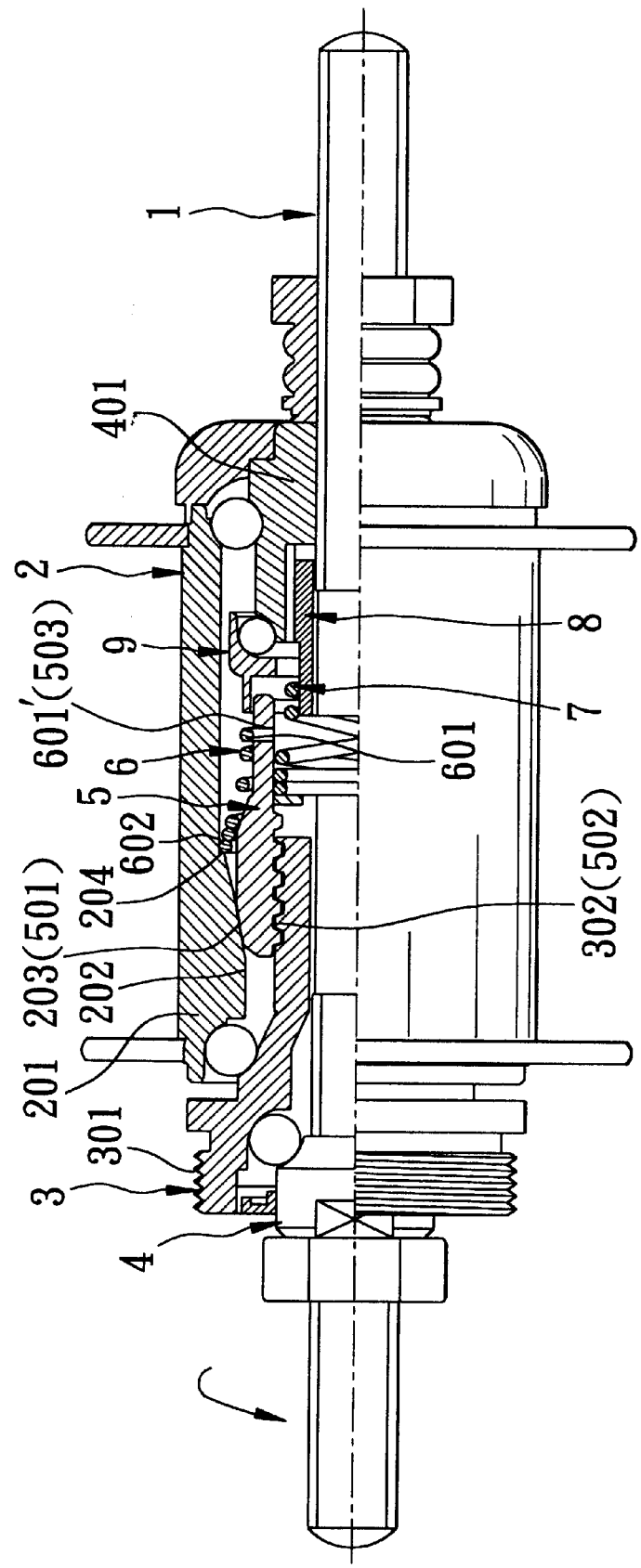
FIG. 1 is a partly sectional view of a freewheeling hub device disclosed in applicant's co-pending U.S. application Ser. No. 09/761908 in an assembled state.
Figure 2:
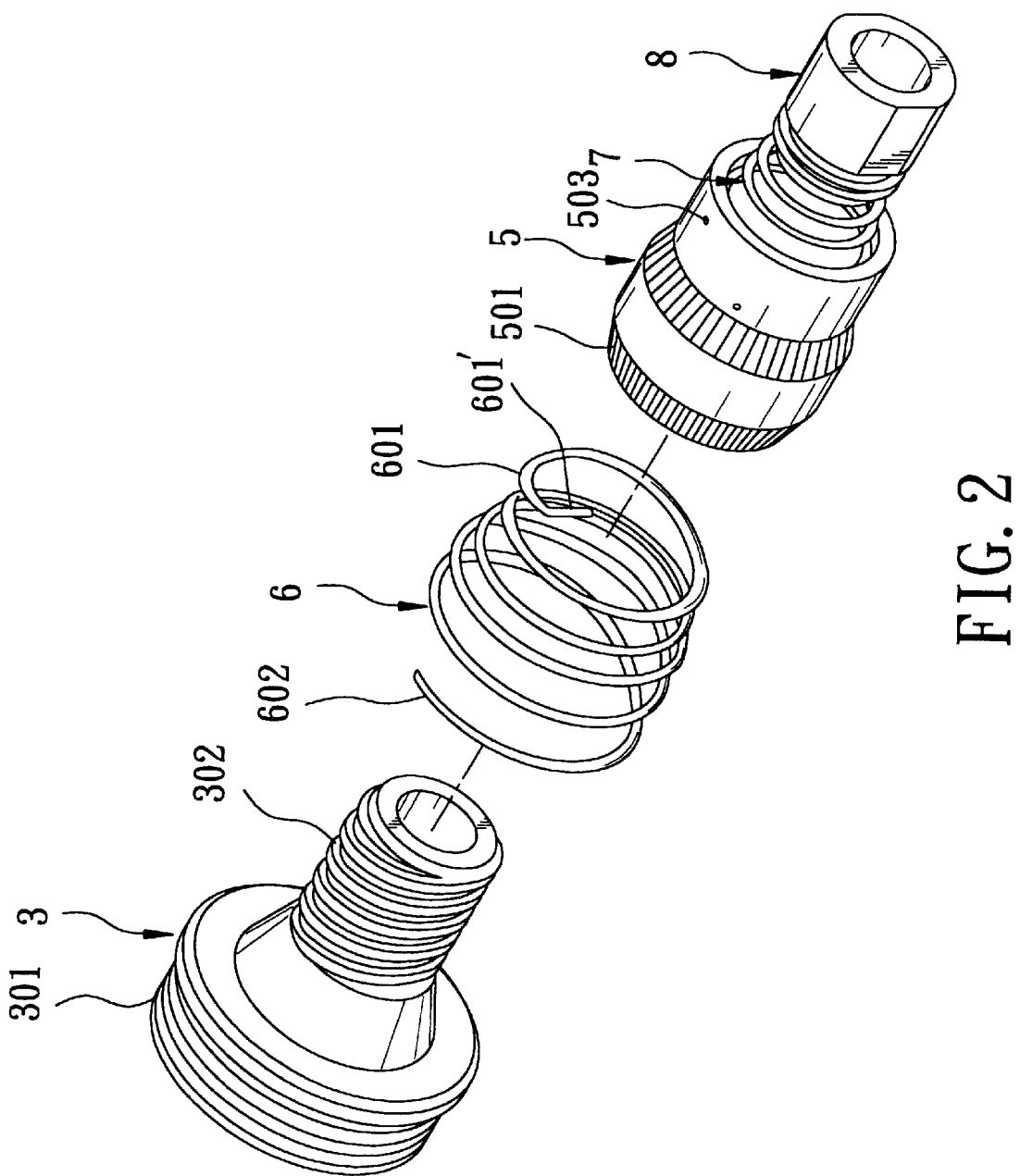
FIG. 2 is an exploded perspective view of the freewheeling hub device of FIG. 2.
Figure 3:
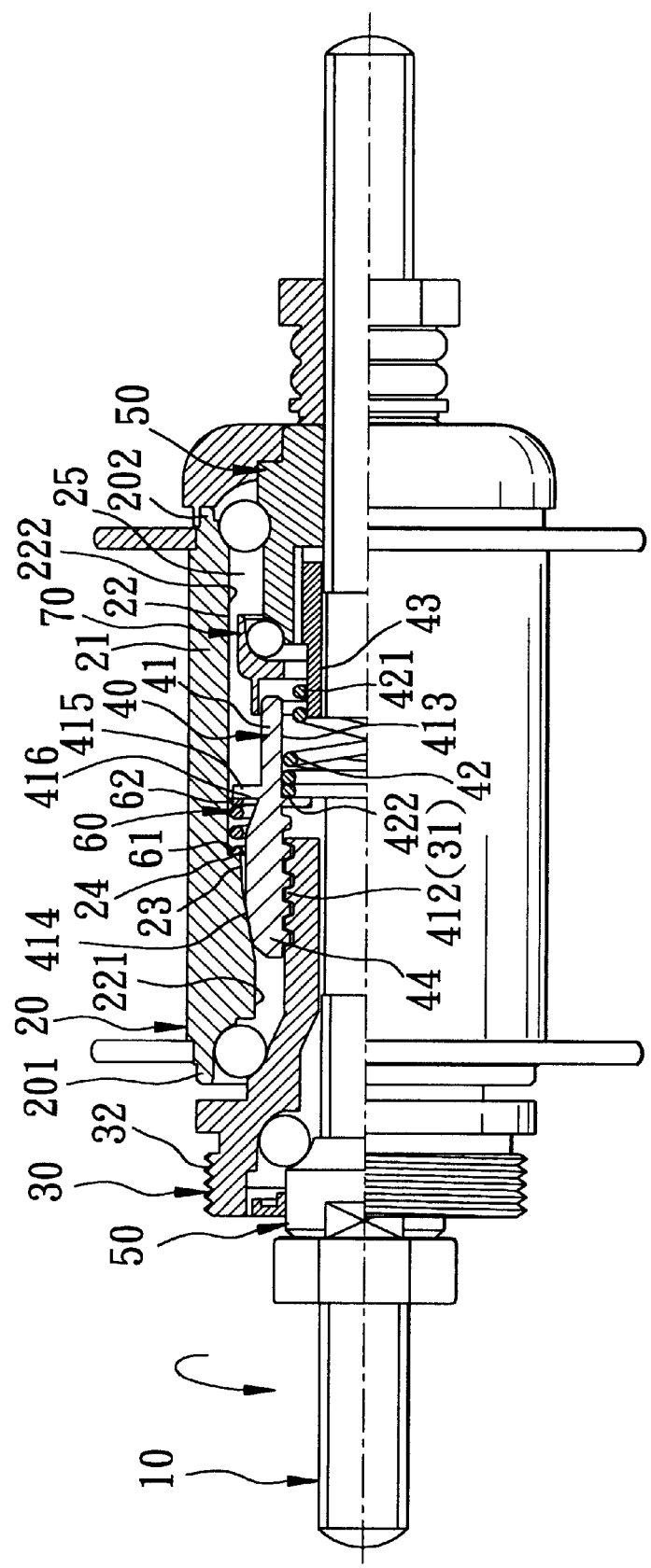
FIG. 3 is a partly sectional view of the preferred embodiment of a wheel hub device according to the invention in a full threaded engagement state.
Figure 4:
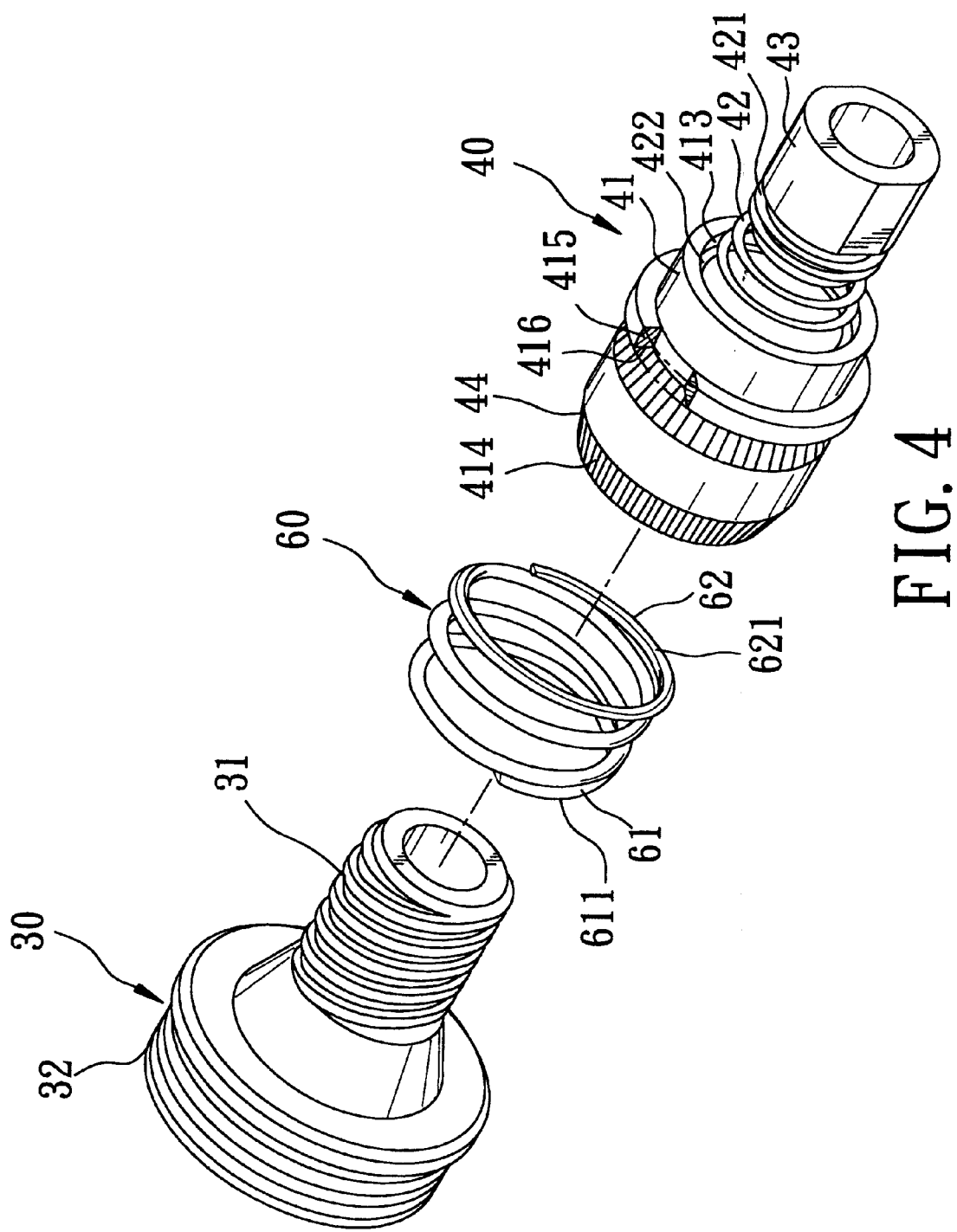
FIG. 4 is an exploded perspective view of the preferred embodiment.

Referring to FIGS. 3 and 4, the preferred embodiment of a wheel hub device according to the present invention is adapted for use in a bicycle which includes an axle 10 extending in an axial direction, a sprocket wheel (not shown) mounted coaxially around and rotatable relative to the axle 10, and a bicycle wheel (not shown) mounted on the wheel hub device for co-rotation therewith. As shown, the wheel hub device includes a hub shell 20, a driving barrel 30, a coupling socket 40, a sliding member 43, an associating spring 42, and a coil spring 60, all of which are adapted to be mounted rotatably on the axle 10. In addition, limiting elements 50 are locked on two ends of the axle 10, and a limiting block 70 is disposed between the coupling socket 40 and an adjacent one of the limiting elements 50.

The hub shell 20 has first and second lateral ends 201, 202 which are disposed opposite to each other in the axial direction, and an annular wall 21 having an inner peripheral wall surface 22 which extends in the axial direction to communicate the first and second lateral ends 201, 202 and which defines a through hole 25. The inner peripheral wall surface 22 has a first wall portion 221 and a second wall portion 222 respectively proximate to the first and second lateral ends 201, 202, and a tapered intermediate wall portion 23 disposed between the first and second wall portions 221, 222. The intermediate wall portion 23 diverges from the first wall portion 221 to the second wall portion 222, and defines a shoulder 24 facing towards the second lateral end 202.

The driving barrel 30 is rotatable relative to the hub shell 20, and includes a head portion 32 which is disposed outwardly of the first lateral end 201 and which is adapted to be rotated with the sprocket wheel (not shown), and an externally threaded portion 31 which is disposed opposite to the head portion 32 in the axial direction and which extends into the through hole 25 so as to be surrounded by the intermediate wall portion 23.

Figure 6:
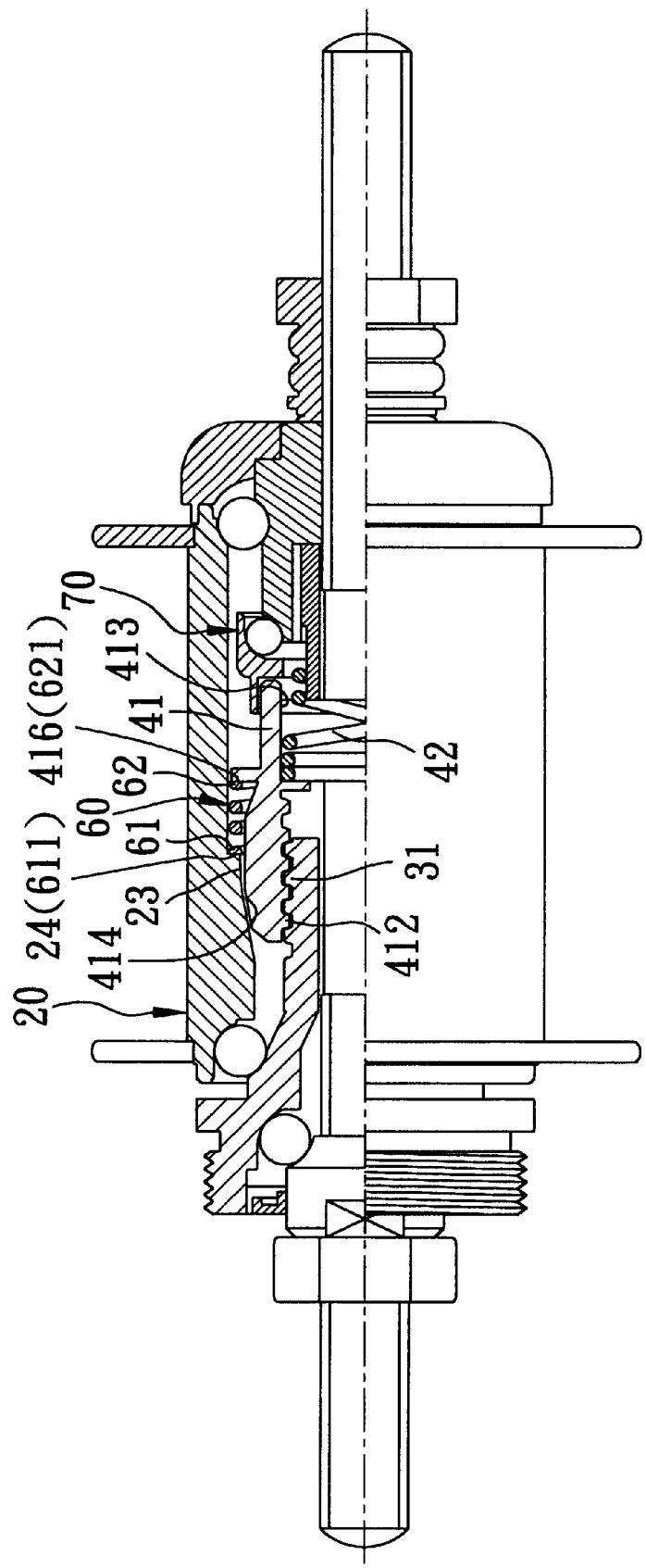
FIG. 6 is a partly sectional view of the preferred embodiment in a partial threaded engagement state.

The coupling socket 40 is disposed rotatably and movably in the through hole 25 in the axial direction, and includes an engaging end 44, a coupling end 41, and an abutment member 415. The engaging end 44 has a tapered outer friction wall surface 414 that confronts the intermediate wall portion 23, and an internally threaded portion 412 that is disposed opposite to the outer friction wall surface 414 in a direction radial to the axial direction so as to be movable in the axial direction between a fully engaged position (as shown in FIG. 3) and a partially engaged position (as shown in FIG. 6). In the fully engaged position, the externally threaded portion 31 is in a full threaded engagement with the internally threaded portion 412 as a result of displacement of the coupling socket 40 toward the intermediate wall portion 23 due to a clockwise rotation (as indicated by the arrow in FIG. 3) of the driving barrel 30 relative to the coupling socket 40, which corresponds to a forward movement of the bicycle wheel via forward pedaling. The outer friction wall surface 414 is frictionally engaged with the intermediate wall portion 23 as a result of the full threaded engagement. Besides, the coil spring 60 is in a compressed state. In the partially engaged position (as shown in FIG. 6), the externally threaded portion 31 is in a partial threaded engagement with the internally threaded portion 412 as a result of a screwing-out movement of the internally threaded portion 412 relative to the externally threaded portion 31, and the outer friction wall surface 414 is disengaged from the intermediate wall portion 23 and moves toward the limiting block 70, thereby resulting in idle rotation of the hub shell 20. The coupling end 41 is disposed opposite to the engaging end 44 in the axial direction away from the driving barrel 30, and has a smooth inner surface 413 adjacent to the internally threaded portion 412. In this embodiment, the abutment member 415 is in the form of an annular flange which is disposed on the coupling socket 40 between the engaging end 44 and the coupling end 41, and which extends radially and outwardly from the coupling socket 40. Furthermore, the abutment member 415 has a retaining surface 416 facing the shoulder 24. When the internally threaded portion 412 is moved to the fully engaged position, the retaining surface 416 of the abutment member 415 spacedly faces and moves toward the shoulder 24 in the axial direction.

The sliding member 43 is adapted to be sleeved on the axle 10, and is movable in the axial direction. The sliding member 43 is splined so as to be restrained from rotation relative to the axle 10.

The associating spring 42 is mounted in the through hole 25 and is interposed between the coupling socket 40 and the sliding member 43. The associating spring 42 includes a connecting end 421 connected to the sliding member 43, and a friction end 422 abutting against the smooth inner surface 413 of the coupling end 41 of the coupling socket 40 at a position radially opposite to the abutment member 415.

Figure 5:
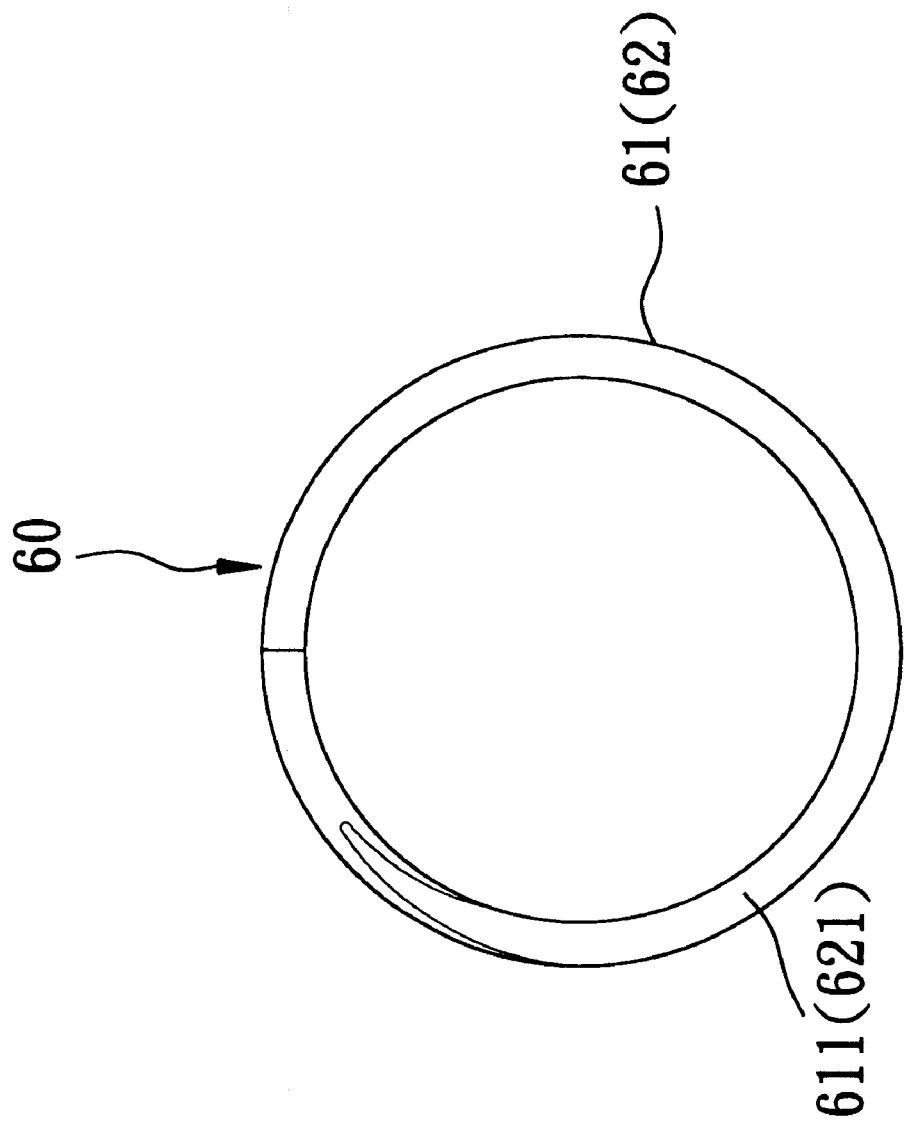
FIG. 5 is schematic view showing an end face of a coil spring of the preferred embodiment.

With further reference to FIG. 5, the coil spring 60, which has a first biasing force, is interposed between the shoulder 24 and the abutment member 415, and has a depressed end 62 and an abutting end 61 disposed opposite to the depressed end 62 in the axial direction. The abutting end 61 spirals clockwise toward the depressed end 62 with a uniform curvature radius. The abutting end 61 and the depressed end 62 respectively have first and second end faces 611, 621, each of which maintains a plane through at least 180 degrees. The first and second end faces 611, 621 respectively abut against the shoulder 24 of the hub shell 20 and the retaining surface 416 of the abutment member 415. The depressed end 62 is disposed to bias against movement of the abutment member 415 towards the shoulder 24 and against a second biasing force of the associating spring 42 which is less than the first biasing force of the coil spring 60.

When the cyclist stops pedaling so that the clockwise rotation of the driving barrel 30 is terminated suddenly, the hub shell 20 continues to rotate clockwise and the bicycle continues to move forward for a distance as a result of inertia, thereby forcing the internally threaded portion 412 to rotate relative to the externally threaded portion 31 in a screwing-out movement so as to be disposed in the partially engaged position. At the same time, the shoulder 24 will impart a frictional force to the abutting end 61 in the clockwise direction as indicated by the arrow in FIG. 3 to enable the depressed end 62 to drag the abutment member 415 and the coupling end 41 of the coupling socket 40 to rotate relative to the associating spring 42 while the depressed end 62 is biasing against movement of the abutment member 415 and against the second biasing force of the associating spring 42. When the coupling end 41 is dragged by the depressed end 62 to rotate relative to the associating spring 42, the friction end 422 of the associating spring 42 is in a rotatable and frictional contact with the coupling end 41. When the frictional force between the abutting end 61 and the shoulder 24 and that between the depressed end 62 and the abutment member 415 are greater than the frictional force between the associating spring 42 and the inner surface 413 of the coupling end 41, the coupling socket 40 will be forced to rotate relative to the associating spring 42 to thereby expedite the screwing-out movement to place the hub shell 20 in the idle state. During transmission of the frictional force along the coil spring 60 from the abutting end 61 to the depressed end 62 in the partial engaged position, the depressed end 62 drags along the retaining surface 416 of the abutment member 415 and moves around the coupling socket 40. The first biasing force of the coil spring 60 will diminish with the axial displacement of the coupling socket 40 so that the frictional forces at the abutting end 61 and the depressed end 62 gradually decrease.

When the outer friction wall surface 414 is disengaged from the intermediate wall portion 23, the coil spring 60 is in a substantially free state so that the frictional force between the abutting end 61 and the shoulder 24 and that between the depressed end 62 and the abutment member 415 are less than the frictional force between the associating spring 42 and the inner surface 413 of the coupling end 41. Consequently, the coupling socket 40 will stop rotation relative to the associating spring 42, thereby maintaining a suitable clearance between the outer friction wall surface 414 and the intermediate wall portion 23. As such, when the cyclist gets off the bicycle and pulls the bicycle backwards so that the hub shell 20 rotates in a rearward direction, the presence of the clearance will prevent rotation of the driving barrel 30 with the hub shell 20, thereby ensuring safety of the cyclist.

Compared with the freewheeling hub device disclosed in the aforesaid co-pending application, the present invention has the following advantages:

1. As the coil spring 60 has a uniform curvature radius, when the shoulder 24 imparts a frictional force to the abutting end 61, due to the inherent biasing force of the coil spring 60, the depressed end 62 will almost simultaneously force the coupling socket 40 to rotate relative to the associating spring 42, and the outer friction wall surface 414 will instantaneously disengage from the intermediate wall portion 23. Therefore, when the coil spring 60 is checked by the shoulder 24 and prior to outward stretching of the abutting end 61, the depressed end 62 will have initiated rotation of the coupling socket 40. Hence, contact between the abutting end 61 and the inner peripheral wall surface 22 can be prevented to ensure smooth rotation of the hub shell 20 and operation of the coil spring 60.

2. At the instant of termination of pedaling, i.e., when the coil spring 60 is still in a compressed state, the outward stretching force of the coil spring 60 will produce frictional forces between the abutting end 61 and the shoulder 24 and between the depressed end 62 and the abutment member 415. As the first and second end faces 611, 621 provide sufficient areas for generation of frictional forces that are greater than that between the associating spring 42 and the inner surface 413 of the coupling end 41, the coupling socket 40 can be forced to rotate relative to the associating spring 42 in a smooth manner, and there is no loss of transmission of torque. Hence, the outer friction wall surface 414 can smoothly disengage from the intermediate wall portion 23.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A wheel hub device for a bicycle which includes an axle extending in an axial direction, a sprocket wheel mounted coaxially around and rotatable relative to the axle, and a bicycle wheel which is mounted on said wheel hub device for rotation, said wheel hub device comprising:

a hub shell adapted to be rotatably mounted on the axle, and having first and second lateral ends which are disposed opposite to each other in the axial direction, and an inner peripheral wall surface which extends in the axial direction to communicate said first and second lateral ends and which defines a through hole, said inner peripheral wall surface having a first wall portion and a second wall portion respectively proximate to said first and second lateral ends, and an intermediate wall portion which is disposed between said first and second wall portions and which defines a shoulder facing towards said second lateral end;

a driving barrel adapted to be rotatably mounted on the axle and rotatable relative to said hub shell, said driving barrel including a head portion which is disposed outwardly of said first lateral end and which is adapted to be rotated with the sprocket wheel, and an externally threaded portion which is disposed opposite to said head portion in the axial direction and which extends into said through hole so as to be surrounded by said intermediate wall portion;

a coupling socket disposed rotatably and movably in said through hole in the axial direction, and adapted to be rotatably mounted around the axle, said coupling socket including:

an engaging end which has a friction wall surface that confronts said intermediate wall portion, and an internally threaded portion that is disposed opposite to said friction wall surface in a direction radial to the axial direction to be movable in the axial direction between a fully engaged position, where said externally threaded portion is in a full threaded engagement with said internally threaded portion as a result of a clockwise rotation of said driving barrel relative to said coupling socket, which corresponds to a forward movement of the bicycle wheel, and where said friction wall surface is frictionally engaged with said intermediate wall portion as a result of said full threaded engagement, and a partially engaged position, where said externally threaded portion is in a partial threaded engagement with said internally threaded portion as a result of a screwing-out movement of said internally threaded portion relative to said externally threaded portion, and where said friction wall surface is disengaged from said intermediate wall portion;

a coupling end disposed opposite to said engaging end in the axial direction away from said driving barrel; and an abutment member disposed on and extending radially and outwardly from said coupling socket, and located between said engaging end and said coupling end so as to spacedly face and move toward said shoulder in the axial direction when said internally threaded portion is moved to the fully engaged position;

a sliding member adapted to be sleeved on the axle, and movable in the axial direction;

an associating spring mounted in said through hole, adapted to be disposed around the axle, and interposed between said coupling socket and said sliding member such that, during the screwing-out movement, said associating spring cooperates with said sliding member to stabilize movement of said coupling socket in the axial direction; and a coil spring adapted to be disposed around the axle, and interposed between said shoulder and said abutment member, said coil spring having a first biasing force and including a depressed end disposed to bias against movement of said abutment member towards said shoulder and against a second biasing force of said associating spring, and an abutting end disposed opposite to said depressed end in the axial direction to abut against said shoulder such that when the clockwise rotation of said driving barrel is terminated suddenly while the forward movement of the bicycle continues as a result of inertia, said internally threaded portion rotates relative to said externally threaded portion in a screwing-out movement so as to be disposed in the partially engaged position, and a frictional force is simultaneously imparted to said abutting end to enable said depressed end to drag said abutment member and said coupling end of said coupling socket to rotate relative to said associating spring while said depressed end is biasing against movement of said abutment member and against the second biasing force so as to expedite the screwing-out movement.

2. The wheel hub device according to claim 1, wherein said coil spring is interposed between said shoulder and said abutment member such that, in the partially engaged position, said depressed end drags along said abutment member and moves around said coupling socket when the frictional force is transmitted along said coil spring from said abutting end to said depressed end.

3. The wheel hub device according to claim 2, wherein said abutting end and said depressed end of said coil spring respectively have first and second end faces, each of which maintains a plane through at least 180 degrees.

4. The wheel hub device according to claim 2, wherein said first biasing force is greater than said second biasing force.

5. The wheel hub device according to claim 1, wherein said abutment member is formed as an annular flange.

6. The wheel hub device according to claim 1, wherein said associating spring includes a connecting end connected to said sliding member, and a friction end abutting against said coupling end at a position radially opposite to said abutment member.

7. The wheel hub device according to claim 6, wherein said friction end is in frictional contact with said coupling end of said coupling socket when said coupling end is dragged by said depressed end of said coil spring to rotate relative to said associating spring.

8. The wheel hub device according to claim 7, wherein said sliding member is splined so as to be restrained from rotation relative to the axle.

* * * * *